Patented Mar. 28, 1944

2,345,079

UNITED STATES PATENT OFFICE 2,345,079

PROCESS FOR THE PRODUCTION OF ACONITIC ACID

Emil K. Ventre, Herbert C. Henry, and Fred L. Gayle, Baton Rouge, La., assignors to Claude R. Wickard, as Secretary of Agriculture of the United States of America, and his successors in office No Drawing. Application October 10, 1942, Serial No. 461,638

3 Claims. (Cl. 260—537)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of aconitic acid, and it has for its object the recovery of such from its alkaline earth salts, and in particular, from the salts precipitated from certain plant juices.

Alkaline earth aconitates occur naturally in certain plant juices such as sorgo, cane and beet. Calcium aconitate is the principal salt, although others, such as magnesium aconitate, are present.

In general, the production of aconitic acid is effected by reacting the alkaline earth aconitate in presence of water with a mineral acid of such nature that the alkaline earth metal forms a non-soluble salt with the reactant while the aconitic acid remains in solution, whereby the alkaline earth metallic salt may be filtered out, leaving a solution containing the aconitic acid. From this solution the aconitic acid is recovered by a process of crystallization.

The following described process relates particularly to the production of aconitic acid from alkaline earth aconitates precipitated from sorgo juices, but it is also applicable in its production from the alkaline earth aconitates from other plant juices or from other sources.

To start a first batch in the process, a portion consisting of 1,000 parts of the washed and air-dried alkaline earth aconitates precipitated from sorgo juice is given a first treatment with 670 parts of 66° Bé. sulfuric acid diluted with 2,000 parts of water, at a temperature of 100° C. The insoluble material is filtered off, and the filter cake is given a second treatment with a fresh portion of the dilute sulfuric acid at 70° C., to remove the residual aconitic acid. The insoluble portion is again filtered off, and the filter cake is washed with 2,000 parts of water. In order to recover the sulfuric acid and the aconitic acid, if any, contained in the wash water, it is used in the preparation of the dilute sulfuric acid for use with a subsequent batch. Most of the aconitic acid has been removed in the two filtrates and wash water, and the washed filter cake, consisting principally of calcium sulfate, is discarded.

The filtrate from the second treatment contains a large excess of sulfuric acid and is used in the first treatment of a subsequent batch in the manner described above relative to the first treatment of the first batch. The filtrate thus obtained is combined with the filtrate from the first treatment of the first batch, giving a mixture which is principally an aqueous solution of aconitic acid, but contains some free sulfuric acid. The mixture is treated with decolorizing carbon, heated to boiling and filtered.

The clear filtrate is evaporated under vacuum to a concentration in excess of 17° Bé. at 28° C., and the raw aconitic acid is obtained from this concentrate by a crystallization process. A concentration of 26° Bé. at 60° C. of the clear filtrate, which contains about 0.5–1.5 percent of free sulfuric acid carried through because of the quantity of sulfuric acid used in the prior treatments, is satisfactory for the first crystallization. Subsequent crystallizations require increased concentrations until the exhausted mother liquid, separated from the aconitic acid crystals, has a concentration of substantially 31° Bé. at 28° C.

After removal of the crystalline aconitic acid, the mother liquid is concentrated under vacuum to 37° Bé. at 60° C. and the magnesium sulfate, which has been carried through from the sulfuric acid treatments, is crystallized and removed. The residual liquor is then neutralized with calcium carbonate, diluted with water to a workable volume, heated to 100° C. and filtered. The filter cake is washed and returned to the process at the starting point of another batch for removal of any residual aconitic acid.

The raw aconitic acid so produced is melted, treated with decolorizing carbons, heated to boiling, filtered, concentrated in vacuum and recrystallized according to the well-known methods of purification of organic compounds.

The concentrations of liquors expressed in the foregoing are practical working concentrations, but are not absolute, varying somewhat depending on the nature and quantity of materials other than aconitic acid occurring in the filtrates derived from the acid treatments.

Having thus described the invention, what is claimed is:

1. The process of extracting aconitic acid from its alkaline earth salts comprising treating the alkaline earth aconitates with an excess of dilute sulfuric acid to form calcium sulfate as a precipitate in a solution containing aconitic acid and some free sulfuric acid, filtering to remove the calcium sulfate, evaporating the filtrate to a concentration in excess of 17° Bé. at 28° C. and to such degree that it contains about 0.5–1.5 percent free sulfuric acid, and then extracting the aconitic acid from the concentrate by a crystallization process.

2. The process of extracting aconitic acid from its salts of calcium and magnesium comprising treating the salts with dilute sulfuric acid which reacts therewith forming calcium sulfate as a precipitate in a solution containing aconitic acid, filtering to remove the calcium sulfate, evaporating the filtrate to a concentration in excess of 17° Bé. at 28° C., extracting aconitic acid from the concentrate by a crystallization process, evaporating the mother liquid to a concentration of about 37° Bé. at 60° C., then extracting magnesium sulfate from the concentrate by a crystallization process, neutralizing the residual liquor with calcium carbonate, filtering, and returning the filter cake to the process at the beginning of a subsequent batch.

3. The process of extracting aconitic acid from its alkaline earth aconitates precipitated from sorgo juice comprising treating a portion consisting of about 1,000 parts of the washed and air-dried alkaline earth aconitates with about 670 parts of 66° Bé. sulfuric acid diluted with about 2,000 parts of water at about 100° C., filtering, treating the filter cake with another portion of the dilute sulfuric acid at about 70° C., filtering, using the last obtained filtrate to treat a second portion of the aconitates at about 100° C., filtering, mixing the filtrates from the first and last mentioned filterings to give aconitic acid in an aqueous solution containing some free sulfuric acid, decolorizing the solution, evaporating the clear solution to a concentration in excess of 17° Bé. at 28° C. to give a concentrated solution containing from 0.5–1.5 percent free sulfuric acid, and extracting the aconitic acid from concentrated solution by a crystallization process.

EMIL K. VENTRE.
HERBERT C. HENRY.
FRED L. GAYLE.